(12) United States Patent
Ganpule et al.

(10) Patent No.: US 9,965,019 B2
(45) Date of Patent: *May 8, 2018

(54) DYANAMICALLY ADAPTING A VOLTAGE OF A CLOCK GENERATION CIRCUIT

(71) Applicant: Intel Corporation, Santa Clara, CA (US)

(72) Inventors: Tapan A. Ganpule, Folsom, CA (US); Inder M. Sodhi, Folsom, CA (US); Yair Talker, Binyamina (IL); Inbar Falkov, Tel Aviv (IL); Tanveer R. Khondker, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/255,791

(22) Filed: Sep. 2, 2016

(65) Prior Publication Data

US 2016/0370839 A1    Dec. 22, 2016

Related U.S. Application Data

(63) Continuation of application No. 14/138,852, filed on Dec. 23, 2013, now Pat. No. 9,459,689.

(51) Int. Cl.
    *G06F 1/32*    (2006.01)
    *G06F 1/08*    (2006.01)
    *G06F 1/10*    (2006.01)

(52) U.S. Cl.
    CPC ............... *G06F 1/324* (2013.01); *G06F 1/08* (2013.01); *G06F 1/10* (2013.01); *G06F 1/3287* (2013.01); *G06F 1/3296* (2013.01); *Y02B 60/1285* (2013.01)

(58) Field of Classification Search
    None
    See application file for complete search history.

(56) References Cited

U.S. PATENT DOCUMENTS

| 5,163,153 A | 11/1992 | Cole et al. |
| 5,522,087 A | 5/1996 | Hsiang |
| 5,590,341 A | 12/1996 | Matter |

(Continued)

FOREIGN PATENT DOCUMENTS

| EP | 1 282 030 A1 | 5/2003 |
| WO | 2012170213 A2 | 12/2012 |
| WO | 2013137859 A1 | 9/2013 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Paul Yanchus, III
(74) *Attorney, Agent, or Firm* — Trop, Pruner & Hu, P.C.

(57) ABSTRACT

In one embodiment, a processor includes a plurality of functional units each to independently execute instructions and a clock distribution circuit having a clock signal generator to generate a clock signal. The clock distribution circuit is coupled to receive a first operating voltage from a first voltage rail and the functional units are coupled to independently receive at least one second operating voltage from one or more second voltage rails. Other embodiments are described and claimed.

19 Claims, 9 Drawing Sheets

(56) References Cited

U.S. PATENT DOCUMENTS

| | | |
|---|---|---|
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,897,699 B1 | 5/2005 | Nguyen et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,459,689 B2 * | 10/2016 | Ganpule ............... G06F 1/3296 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0134353 A1 | 6/2005 | Tahara |
| 2005/0258881 A1 | 11/2005 | Schultz |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0170480 A1 * | 8/2006 | Chiu ..................... G06F 1/32 327/297 |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0162770 A1 * | 7/2008 | Titiano ................ G06F 1/3203 710/309 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0085100 A1 | 4/2010 | Poulton |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0264930 A1 | 10/2011 | Madar, III |
| 2012/0079290 A1 | 3/2012 | Kumar |
| 2012/0246506 A1 | 9/2012 | Knight |
| 2012/0286883 A1 * | 11/2012 | Horel ................... H03K 3/0315 331/55 |
| 2013/0061064 A1 | 3/2013 | Ananthakrishnan et al. |
| 2013/0063206 A1 | 3/2013 | Hirairi et al. |
| 2013/0080803 A1 | 3/2013 | Ananthakrishnan et al. |
| 2013/0080804 A1 | 3/2013 | Ananthakrishnan et al. |
| 2013/0093485 A1 | 4/2013 | Runas |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/600,568, filed Aug. 31, 2012, entitled, "Configuring Power Management Functionality in a Processor," by Malini K. Bhandaru, et al.

U.S. Appl. No. 13/951,646, filed Jul. 26, 2013, entitled, "Restricting Clock Signal Delivery Based on Activity in a Processor," by Alexander Gendler, et al.

U.S. Appl. No. 13/925,986, filed Jun. 25, 2013, entitled, "Restricting Clock Signal Delivery in a Processor," by Alexander Gendler, et al.

U.S. Appl. No. 14/092,034, filed Nov. 27, 2013, entitled, "Performing an Operating Frequency Change Using a Dynamic Clock Control Technique," by Alexander Gendler, et al.

U.S. Appl. No. 14/109,388, filed Dec. 17, 2013, entitled, "Rescheduling Workloads to Enforce and Maintain a Duty Cycle," by Inder M. Sodhi, et al.

Igarashi, M, et al.: "A Low-Power Design Method Using Multiple Supply Voltages", Proceedings of International Symposium on Low Power Electronics and Design, XX, XX, Aug. 20, 1997, pp. 36-41, XP002359101.

European Patent Office, Extended Search Report dated Jun. 2, 2015, in European Patent Application No. 14192167.6.

(56) References Cited

OTHER PUBLICATIONS

European Patent Office, Examination Report dated Dec. 14, 2017, in European Patent Application No. 14192167.6.

* cited by examiner

DYANAMICALLY ADAPTING A VOLTAGE OF A CLOCK GENERATION CIRCUIT

This application is a continuation of U.S. patent application Ser. No. 14/138,852, filed Dec. 23, 2013, the content of which is hereby incorporated by reference.

TECHNICAL FIELD

Embodiments relate to power management of a system, and more particularly to power management of operating voltages.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, a clock distribution system of a processor or other system on chip (SoC) can be independently controlled separately from functional units of the processor. More specifically, embodiments provide for independent power delivery and voltage control for these different components of the processor. In doing so, independent power management of the clock distribution system and the functional units may occur, which may enable power savings, as an operating voltage provided to the clock distribution circuit may be lower than one or more operating voltages to be supplied to the functional units.

In contrast, in processors in which a clock distribution system uses the same voltage plane as the functional units that use the resulting clock signal (often done both for cost savings and platform flexibility), the clock distribution system is over-designed and may consume significant power, especially when the functional units operate at lower (efficient) operating points. This is so, as higher power consumption by the clock distribution system limits the lowest power consumption floor that the processor can achieve during idle or low performance states.

Instead using embodiments described herein, power delivery to a clock distribution system and functional units is decoupled. In addition, the dynamic clock power management techniques described herein optimize and tune the setting of a clock grid power plane for best power/performance. This is so in part, as the clock distribution system may be scaled independently of the clock/power consumption in the functional units, particularly during idle scenarios.

In an embodiment, multiple stages are used to determine appropriate settings for an operating voltage for the clock delivery network: frequency collection; voltage determination; and compensation calibration. In the frequency collection stage, control logic queries functional units to determine a desired clock frequency and calculates an appropriate clock grid frequency. In the voltage determination stage, once the frequency is determined, the optimal voltage is determined by considering this frequency and additional factors such as temperature and load line parameters. In the last stage, based on the current operating point, clock compensators and level shifters may be controlled to meet a clock skew target for the desired operating point.

Figure 1:
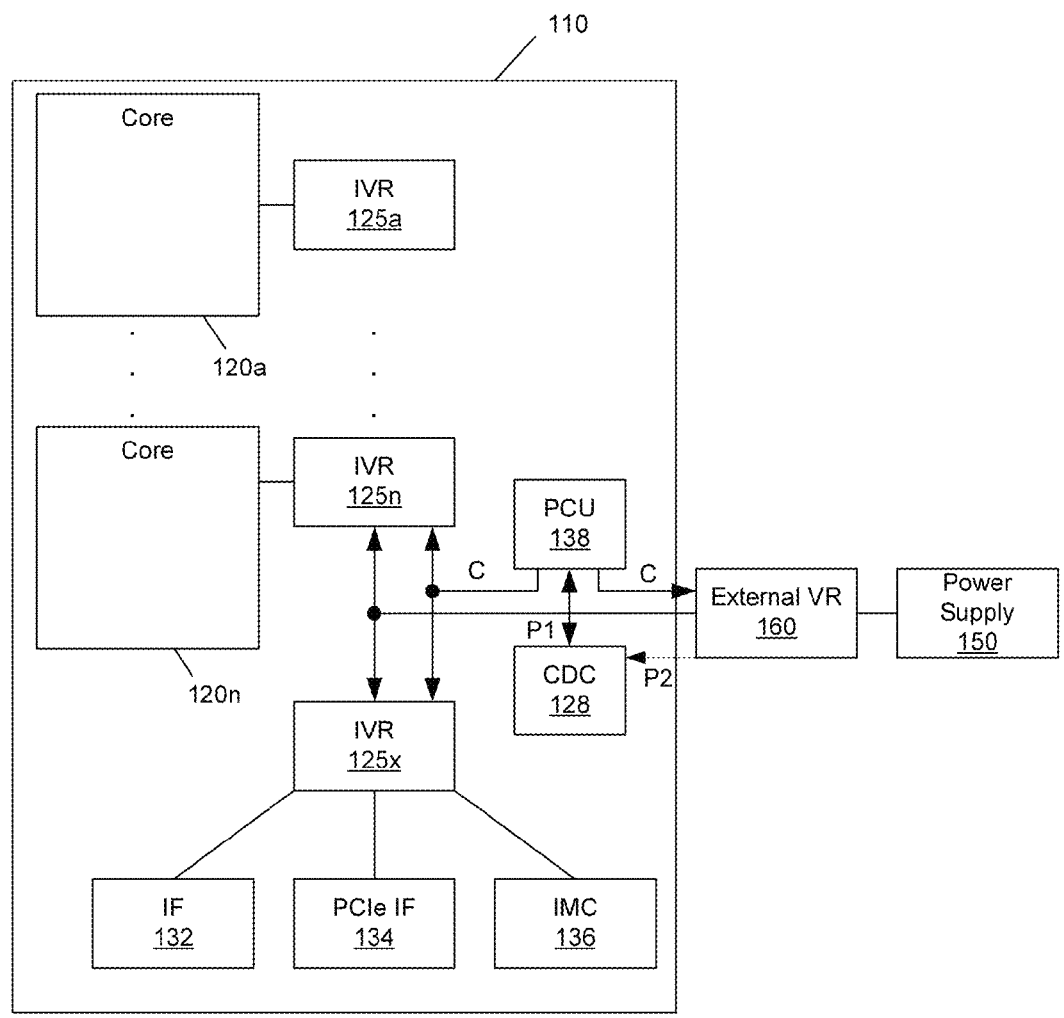
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110. Note although a single external voltage regulator is shown, in other embodiments multiple regulators may be present.

As seen, processor 110 may be a single die processor such as a multicore processor including multiple cores $120_a$-$120_n$ or other SoC. In addition, each core may be associated with an integrated voltage regulator (IVR) $125_a$-$125_n$ which receives the primary regulated voltage via a first voltage or power rail P1 and generates an operating voltage to be provided to one or more agents of the processor associated with the IVR. The IVR implementation of FIG. 1 may be provided to allow for fine-grained control of voltage and thus power and performance of each individual core. As such, each core can operate at an independent voltage and frequency, enabling great flexibility and affording wide opportunities for balancing power consumption with performance.

A clock distribution circuit 128 is also present in processor 110. In general, clock distribution circuit 128 is configured to generate a clock signal to provide to one or more functional units of the processor. To this end, to enable operation of clock distribution circuit 128, an independent operating voltage is provided from voltage regulator 160 via a second voltage or power rail P2. Note that with multiple power rails provided to processor 110 from voltage regulator 160, independent operating voltages may be provided to clock distribution circuit 128 and a remainder of the processor. Furthermore, because it is possible that the operating voltage for clock distribution circuit 128 may be lower than a highest operating voltage provided via first power rail P1, second power rail P2 may be a low current power rail, reducing size and costs. Note that while not shown in FIG. 1 for ease of illustration understand that clock distribution circuit 128 generates one or more clock signals that may be provided to each of the functional units present in processor 110.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode).

In various embodiments, PCU 138 may include clock control logic to control an operating frequency of the clock signal generated by clock distribution circuit 128. Furthermore, such clock control logic may be configured to perform dynamic adaptive voltage control of the operating voltage provided to clock distribution circuit 128, as described further herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the adaptive voltage control for a clock distribution system described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
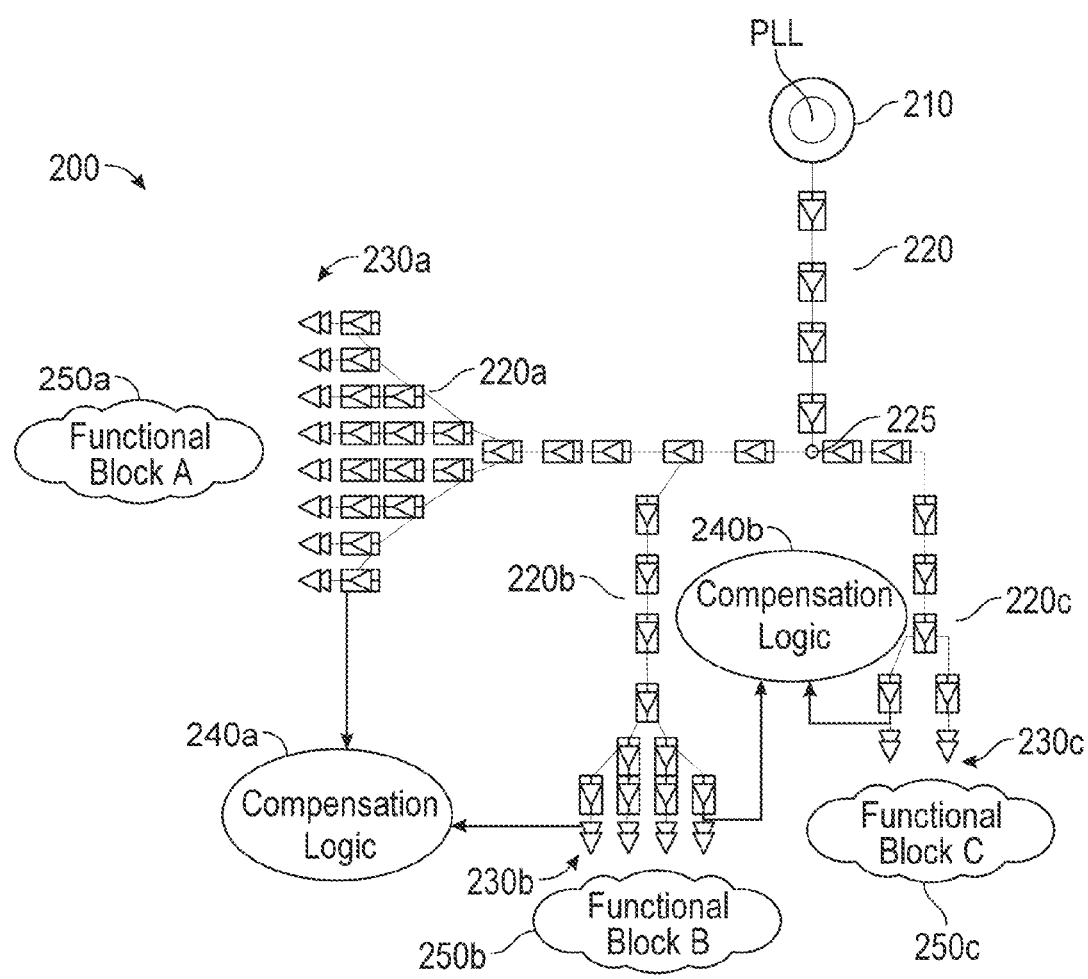
FIG. 2 is a block diagram of a portion of a processor in accordance with an embodiment of the present invention.

Referring now to FIG. 2, shown is a block diagram of a portion of a processor 200 in accordance with an embodiment of the present invention. As shown in FIG. 2, processor 200 includes a clock distribution circuit (alternately referred to herein as a clock grid or clock distribution network) including elements to generate a clock signal at a desired frequency and to provide the clock signal to various functional units of the processor. As seen in the embodiment of FIG. 2, a PLL 210 is present. This PLL generates a clock signal at a frequency requested by a given control entity, such as a PCU or other processor or platform component.

As seen, PLL 210 is coupled to further components of a clock distribution circuit 220, also commonly referred to as a clock grid. In the embodiment shown, clock distribution circuit 220 includes a plurality of branches 220*a*-220*c* each of which is to couple to a corresponding functional unit 250*a*-250*c*. These functional units may vary in different embodiments and can be any type of logic present in a processor such as one or more cores (homogeneous or heterogeneous cores), graphics processing units, fixed function units, or specialized intellectual property (IP) blocks. In other implementations understand that finer grained clock control may be possible, in which the components of circuit 200 are all within a single functional unit such as a core.

In general, each branch 220 includes a series chain of drivers or buffers between PLL 210 and a corresponding functional unit. Note that each corresponding branch 220 has an equal number of serial drivers in its path from a distribution node 225 to a corresponding end of distribution point. Furthermore, note that at least some of branches 220 may have a different fanout width, equal to a number of individual clock signals to be provided to the corresponding functional unit. For example, branch 220a is shown to include a fanout width of 8, such that 8 individual versions of the clock signal may be provided to functional block 250a, as this functional block may include large amounts of logic to be operated using these clock signals (e.g., a large out-of-order vector-based core). However, note that a smaller fanout width is present in branches 220b and 220c. Of course understand that different fanout widths may be present in different designs.

As further shown in FIG. 2, at an end of distribution point for each of the branches, a corresponding level shifter 230a-230c is present. In general, these level shifters are configured to provide a voltage level shift from a voltage level at which PLL 210 operates to a corresponding voltage level at which the corresponding functional unit operates, to allow operation in the different voltage domain. Level shifters 230 may be controlled using clock control logic of a PCU as described herein. In addition, corresponding compensation logics 240a and 240b are provided to adjust the edge of the clock signal to align with the end of distribution. More specifically, compensation logic 240 is configured to provide phase shift compensation such that the clock signals provided to each of the functional units have minimal skew or phase mismatch between them. To this end, compensation logic 240a is configured to determine a phase shift between clock edges of the clock signal being provided to functional units 250a and 250b and to perform appropriate phase shifting of the clock edges to reduce or remove undesired skew (and similarly compensation logic 240b couples between functional units 250b and 250c and operates in the same manner). Although shown at this high level in the embodiment of FIG. 2, understand the scope of the present invention is not limited in this regard.

According to various embodiments, a processor includes multiple voltage planes and the voltage source for the clock distribution network is decoupled from the voltage source for the functional units. More specifically, embodiments may provide a first voltage plane or domain that includes PLL 210, clock distribution circuit 220, and compensation logic 240, while level shifters 230 may be implemented both within the clock distribution and functional block voltage domains. In turn, one or more independent and separate voltage domains may include functional units 250a-250c. Understand that each of these voltage domains may receive an operating voltage from a dedicated voltage or power rail that in turn is coupled to a voltage regulator. In some embodiments, this independent voltage rail coupled to the PLL may be a low current voltage rail that is not coupled to the functional units. In different implementations, this voltage regulator may be internal to a processor or may be an external voltage regulator. In some implementations a single voltage regulator may be coupled via multiple power rails to the corresponding voltage domains. In other embodiments, multiple voltage regulators may be provided, each associated with a corresponding voltage domain.

By decoupling voltage signals and thus power distribution between clock circuitry and functional units of a processor, a lower operating voltage may be realized, at least for the clock distribution circuit. In this way, reduced power consumption can be realized. This is so, as a clock distribution circuit may operate at a lower operating voltage than functional unit circuitry, particularly when a given functional unit is operating in a high power mode, such as a turbo mode in which a core or other functional unit operates at a turbo mode frequency and at a higher voltage level. By providing corresponding level shifters and phase compensation at an end of distribution of branches of a clock distribution circuit, the clock signal being provided from the clock distribution grid may be tuned and/or matched to the operating voltage at which the functional units are operating. And when a processor is lightly loaded (e.g., in a lower power state) the clock operating voltage may be even lower, as there may be fewer active functional units to drive.

Figure 3:
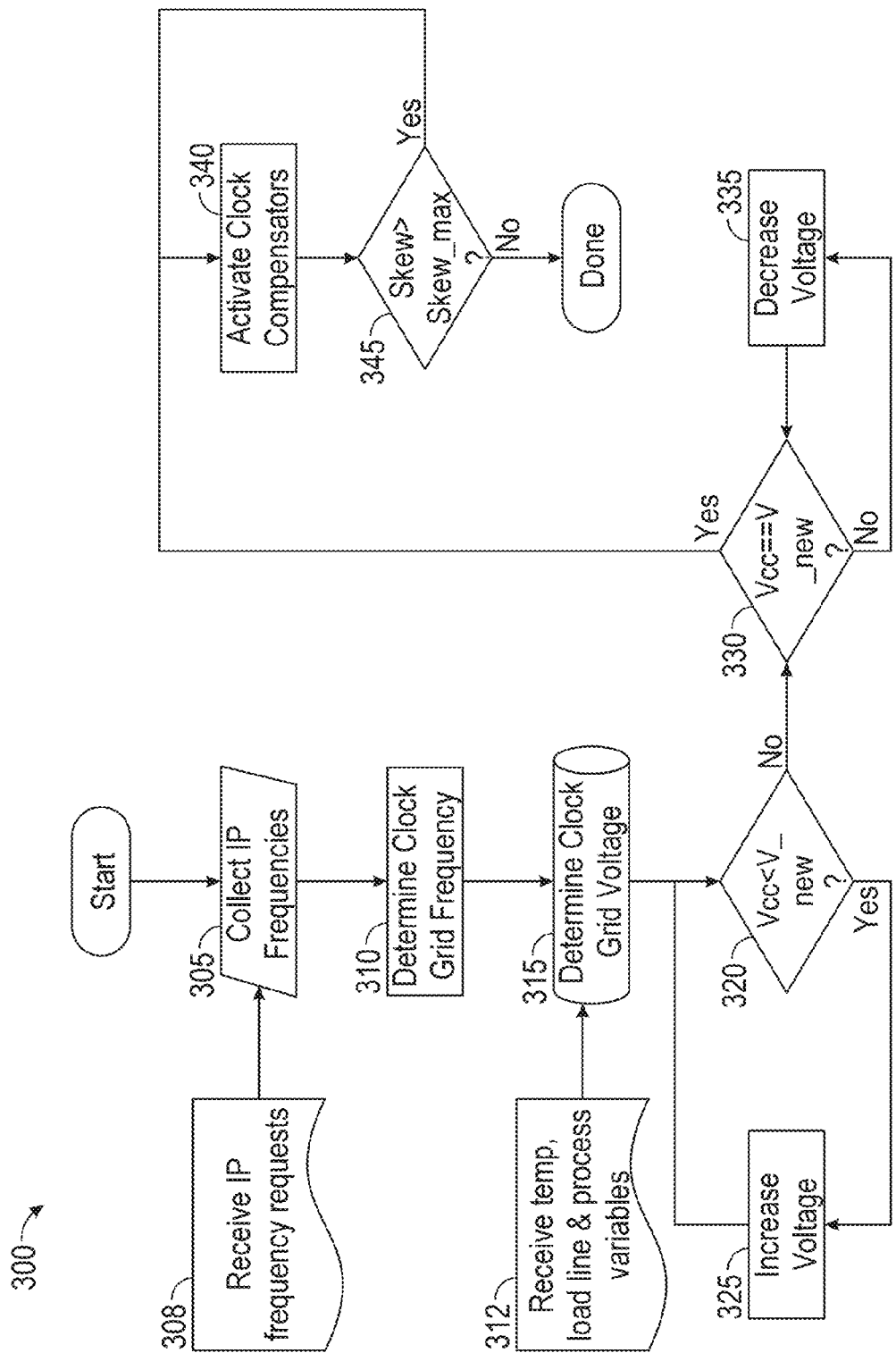
FIG. 3 is a flow diagram of a method in accordance with an embodiment of the present invention.

Referring now to FIG. 3, shown is a flow diagram of a method in accordance with an embodiment of the present invention. In general, method 300 may operate to dynamically determine and control clock grid voltage and frequency. As shown in FIG. 3, method 300 may be used to establish an operating voltage for a clock distribution network and to control components of the distribution network and corresponding logic to enable a clock signal generated at one voltage to be provided to corresponding functional units at a potentially different voltage. In an embodiment, method 300 may be performed by logic of a power controller, such as clock control logic of a PCU. In addition, various portions of the method such as the compensation performed may be done under the direction of this clock control logic and further using additional compensation logic associated with the clock distribution circuit. In one particular implementation, method 300 may be implemented as part of firmware for a power controller such as so-called P-code that operates according to an established periodic interval, such as one millisecond or other predetermined interval. Also understand that method 300 may further be executed on a system reset or according to other predetermined operating conditions.

As seen, method 300 begins by collecting operating frequencies for various functional units of the processor (block 305). In an embodiment, these operating frequency values may be received from different sources such as software, hardware and/or firmware. For example, in an embodiment these operating frequencies may be determined responsive to requests for operation in a given P-state. Alternately, a hardware-based mechanism may be provided such that each functional unit provides a measure of its operating frequency to the clock control logic. Note also that these operating frequency requests may be received asynchronously or at random times and stored, e.g., in a buffer or other temporary storage so that they can be analyzed when method 300 is executed. Thus as seen, at block 308 these incoming frequency requests may be received and stored.

From all of these frequencies provided, next at block 310 a clock grid frequency may be determined. In an embodiment, this clock grid frequency, which may be the operating frequency at which a PLL generates a clock signal, may be set to a maximum of the collected functional unit frequencies. Then based on this determined clock grid frequency, a corresponding clock grid operating voltage may be determined (block 315). In an embodiment, in addition to the clock grid frequency, environmental information such as temperature information, load line capabilities, and process variables such as device characteristics (e.g., leakage and transistor type), may be taken into account in determining an appropriate operating voltage for the clock grid (received at block 312). Note that with regard to these variables, process and platform-based inputs may be configured as hardcoded settings stored in a non-volatile storage and provided at reset. However, the temperature information may dynamically change during operation and can be regularly provided to clock control logic during execution of method 300.

To generate the clock grid voltage at the desired operating voltage level, clock control logic may send a control signal to a corresponding voltage regulator to enable the voltage regulator to dynamically modify an output level to the requested operating voltage level.

Next, at diamond 320 it can be determined whether a voltage (e.g., at a supply voltage node coupled to an input of the PLL) is less than the requested clock grid operating voltage. If so, control passes to block 325 where the clock control logic can request the voltage regulator to further increase the operating voltage. Similarly, if the voltage at the supply voltage node is greater than the requested clock grid voltage, control operations at diamond 330 and block 335 are performed.

When it is determined that the correct requested clock grid operating voltage is present, control passes from diamond 330 to block 340 where clock compensation logic may be activated. That is, because at this point the PLL is operating at the desired operating voltage, active clock compensation can be performed. Note that this compensation takes multiple forms and includes control of level shifters to enable a voltage level shift from the operating voltage of the clock grid to the operating voltage of the corresponding functional units. In addition, phase compensation occurs to remove undesired skew between the clock signal as provided independently to the different functional units. In general, the active compensation logic may operate to adjust this clock skew (namely, a delta between clock edges at the point of distribution (at the end of the branches) and the clock source) to be smaller than a maximum skew setting. Note that in some embodiments, this setting can be changed based on profiling system behavior and optimizing tradeoffs between power and performance. Although the scope of the present invention is not limited in this regard, in an embodiment this clock compensation for phase differences may include determining the required clock delay and adjusting the logic (such as bubble generator buffers) to account for larger skew at lower operating points (e.g., using a different pointer separation in the buffers).

Next it is determined whether the remaining skew between the clock signal as provided to corresponding functional units is greater than a maximum skew value (diamond 345). If so, further active clock compensation is performed at block 340. Otherwise, method 300 concludes. Although shown at this high level in the embodiment of FIG. 3, understand the scope of the present invention is not limited in this regard. For example, while shown as a single maximum skew value, understand that in different implementations the maximum skew parameter may be dynamically adjusted, e.g., based on operating point and performance needs from the system.

In addition, understand that other options are possible. For example, the determined clock grid voltage may turn out to be too low. Such a low voltage for the clock distribution network may cause adverse effects, such as an undesired amount of skew in which insufficient clock compensation may occur. In such cases, the operating voltage may be adaptively increased in a stepwise fashion until it is determined (at diamond 345) that a remaining skew value is less than the maximum skew value. That is, it can be determined whether skew compensation results in a residual skew value less than the maximum skew value within a threshold duration. If not, method 300 may be performed iteratively with gradual increases in operating voltage until the residual skew value is less than the maximum skew value.

Furthermore, understand that in some operating conditions, the clock distribution network and one or more the functional units may operate at a common operating voltage level. In such cases, the operation of method 300 may be greatly simplified and certain circuitry, such as the level shifters, may be bypassed in this condition. Furthermore, while the embodiment of FIG. 3 assumes a single clock distribution network that generates a single clock signal at one operating frequency, it is possible for multiple clock distribution networks to be provided, each with a corresponding PLL, and each capable of generating a different clock signal at a different operating frequency and further being powered by independent power rails.

Figure 4:
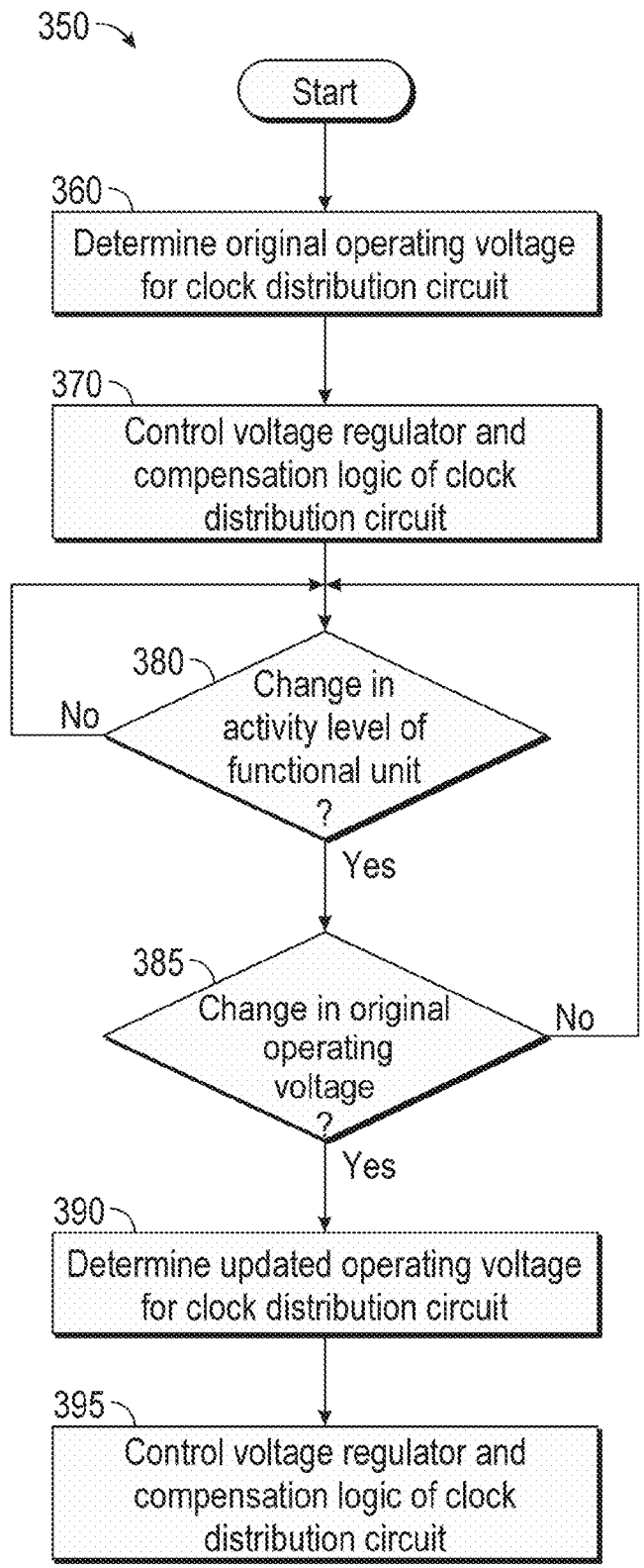
FIG. 4 is a flow diagram of a method in accordance with another embodiment of the present invention.

Referring now to FIG. 4, shown is a flow diagram of a method in accordance with another embodiment of the present invention. As shown in FIG. 4, method 350 may similarly be performed by clock control logic such as logic of the PCU. In general, method 350 describes the operations performed in adaptively and dynamically controlling operating voltage during processor operation. As seen, method 350 begins by determining an original operating voltage for the clock distribution circuit (block 360). In an embodiment, this determination may be performed on system reset when the processor is powered up. As described above, the voltage determination may take into account the operating frequency at which the clock signal is to be generated, along with various environmental conditions including temperature, load line information and so forth.

Then at block 370, a voltage regulator and compensation logic of the clock distribution circuit may be controlled accordingly. For the voltage regulator, this control may include sending a control signal, e.g., in the form of a voltage identification code (VID) to cause the voltage regulator to generate the requested operating voltage, which may be provided by an independent power rail coupled between the voltage regulator and the clock distribution circuit. For purposes of the compensation logic, control signals may be communicated to enable the compensation logic both to perform phase correction as well as control level shifters to enable voltage level shifting as described herein.

Still referring to FIG. 4, next it can be determined, e.g., during normal operation, whether a change in activity level of one or more functional units has occurred (diamond 380). Such change in activity level may occur routinely during normal system operation as various cores and other functional units of a processor enter into and exit from various activity states including active states, low power states, turbo mode states and so forth. On a change in activity level, control passes to diamond 385 where it can be determined whether a change in operating voltage is appropriate, in light of the activity level change. For example, when a functional unit (or multiple units) is placed into a low power state in which this unit is powered off, a portion of the clock distribution network may be disabled, triggering a lighter load for the clock signal generated. Accordingly, the clock distribution circuit may operate at a lower operating voltage.

Thus depending on, e.g., the level in the amount of fanout to be provided, it can be determined whether a change in this original operating voltage is warranted. If so, control passes to block 390, where a determination may be made as to an appropriate updated operating voltage for the clock distribution circuit, which may be at a lower level than the original operating voltage. Otherwise control passes back to diamond 380 discussed above to determine whether another change in activity level occurs. When a new operating voltage is warranted as determined at block 390, control then passes to block 395 where the voltage regulator and compensation logic of the clock distribution circuit may be controlled accordingly, e.g., by sending updated control signals. Although shown at this high level in the embodiment of FIG. 4, understand the scope of the present invention is not limited in this regard.

Accordingly, embodiments provide techniques to decouple the clock grid power from the power plane used for one or more functional units. In addition, embodiments provide a hardware-based mechanism to track, control and compensate clock signal generation.

Figure 5:
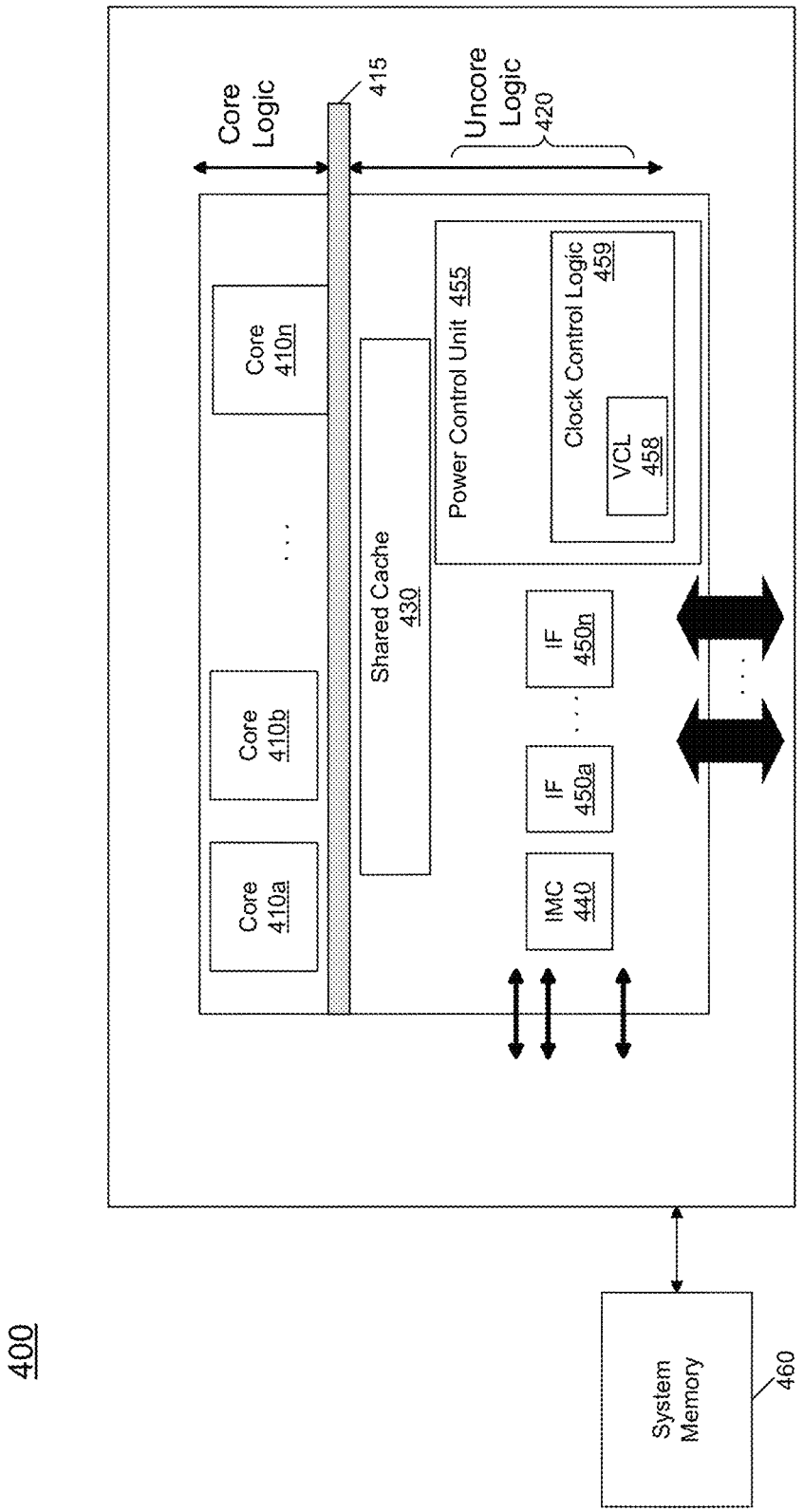
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a clock control logic 459 with an included dynamic adaptive voltage at logic 458 in accordance with an embodiment of the present invention. Using this logic, the operating voltage provided to a clock distribution network may vary from an operating voltage provided to functional units. In addition, clock control logic 459 may dynamically control compensation logic such that clock signals generated at one voltage level can be shifted to a second level at which one or more functional units generate.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
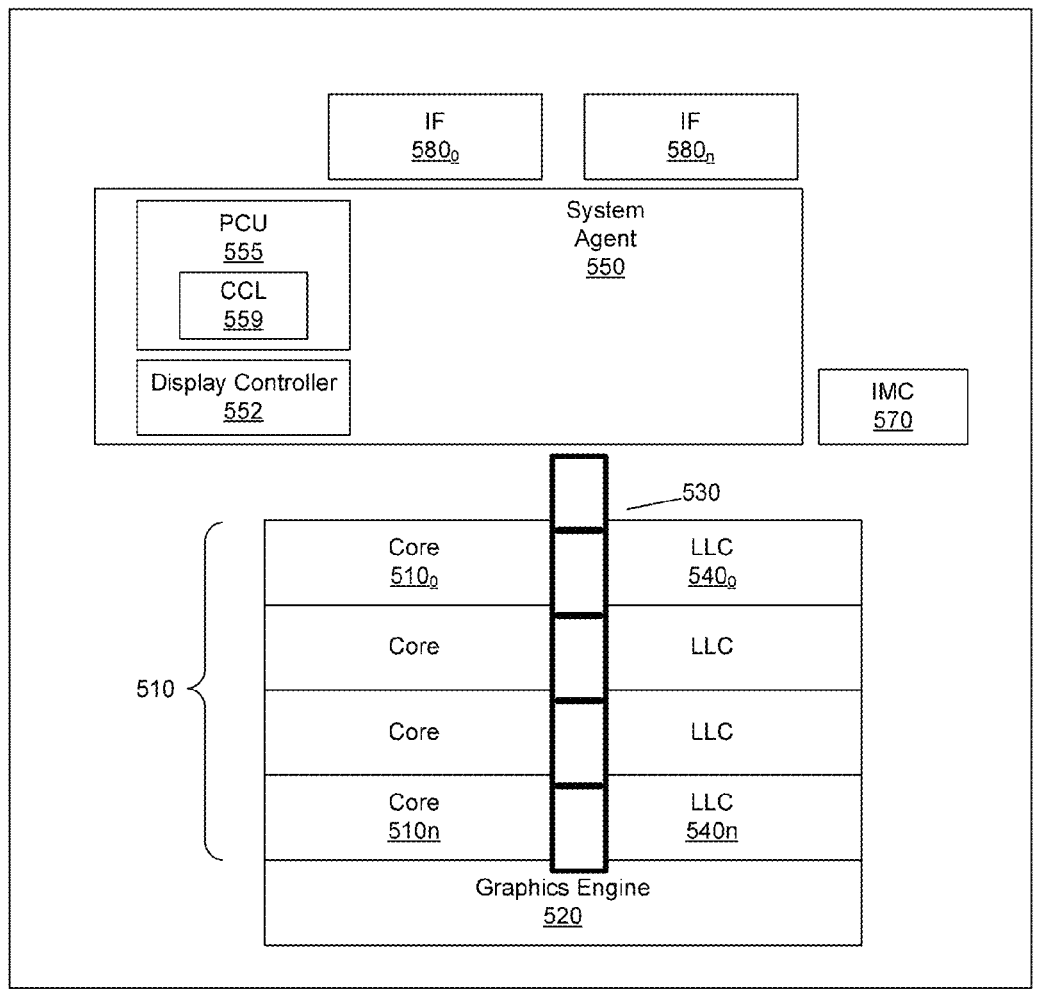
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a clock control logic 559 in accordance with an embodiment of the present invention to dynamically control clock distribution and then enable a clock distribution network to generate at a different operating voltage than functional blocks receiving clock signals from the distribution network. In various embodiments, this logic may execute the algorithms described above in FIG. 3.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
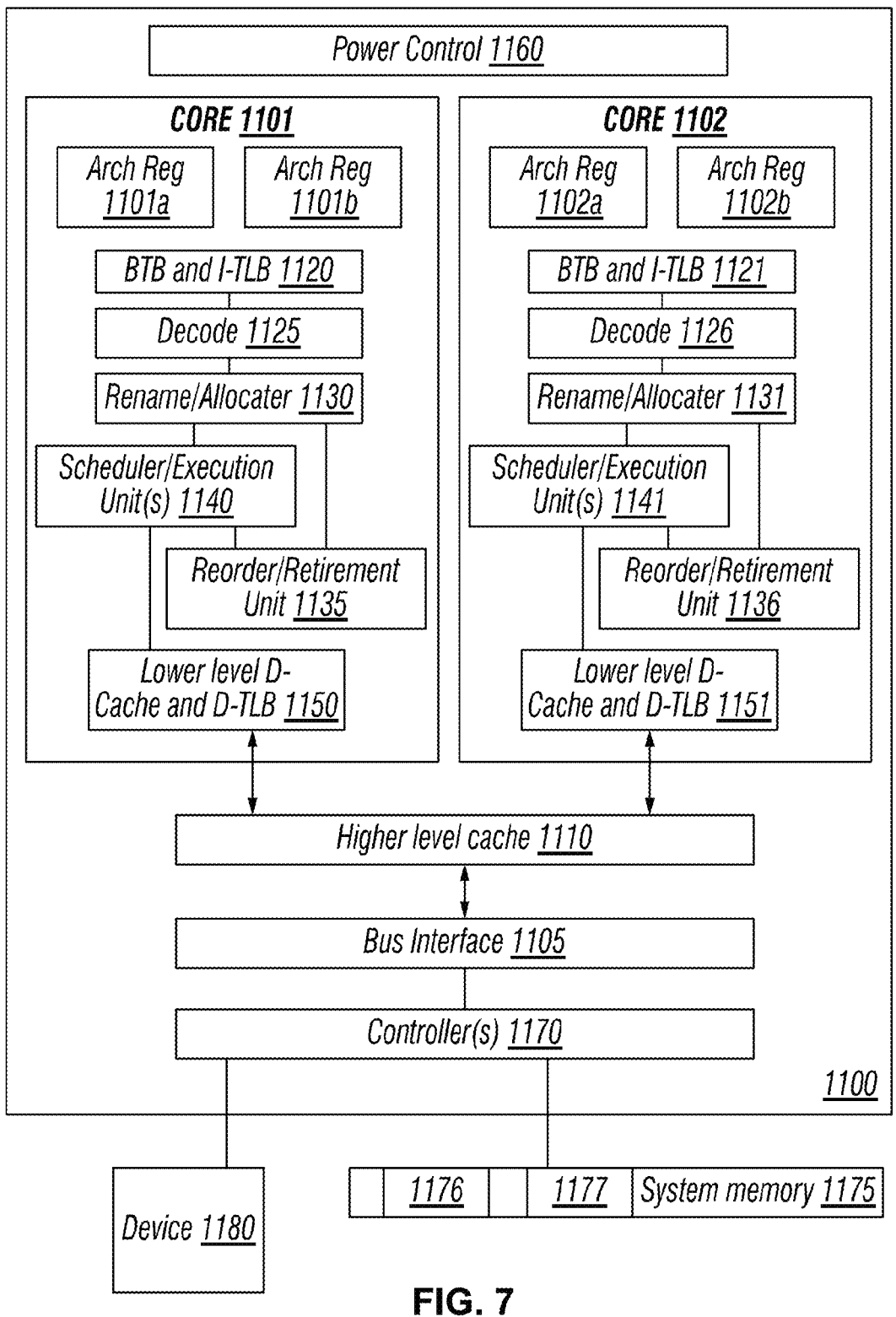
FIG. 7 is an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
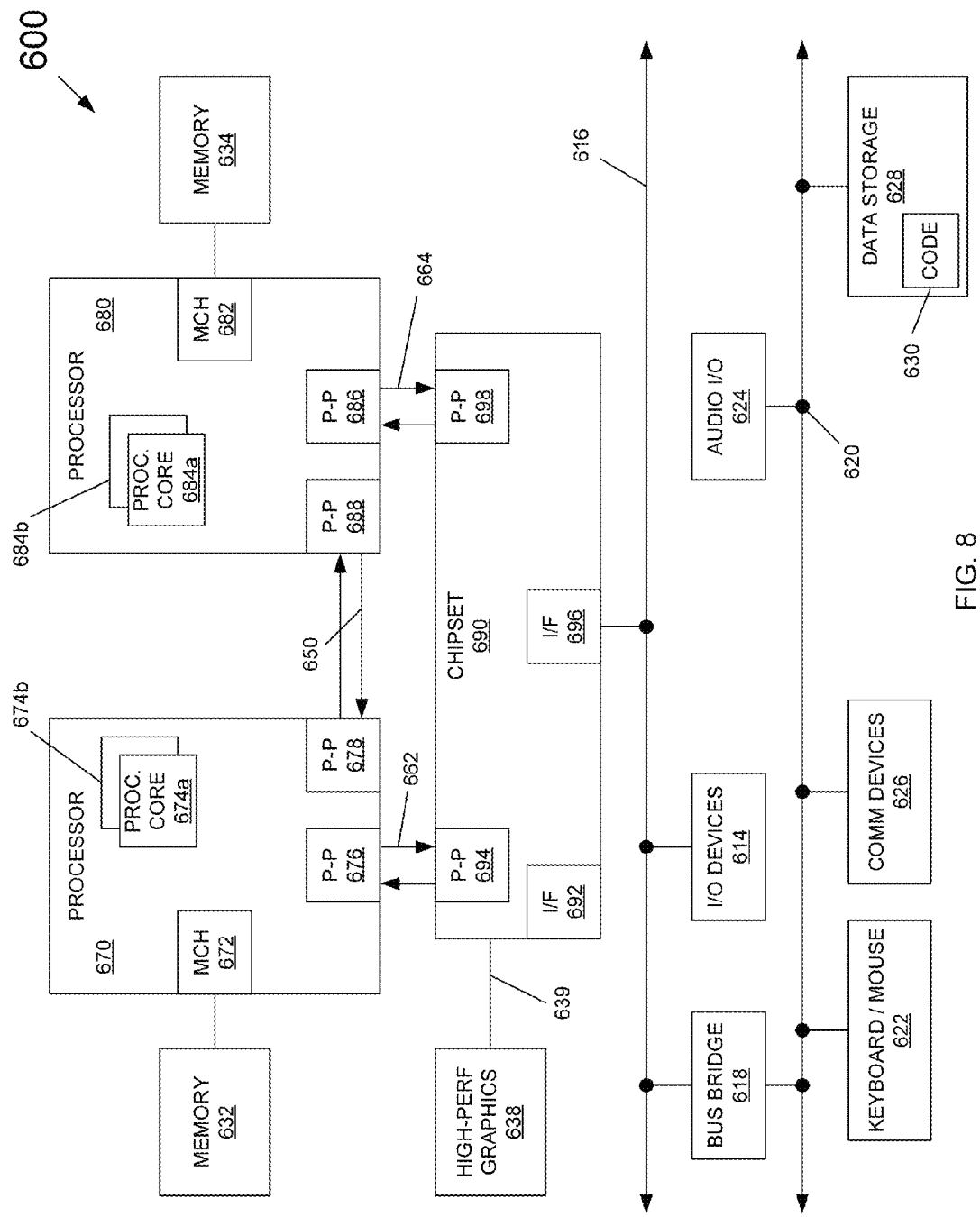
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to provide independent operating voltages to clock distribution circuitry and the functional units receiving clock signals from the distribution circuitry, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
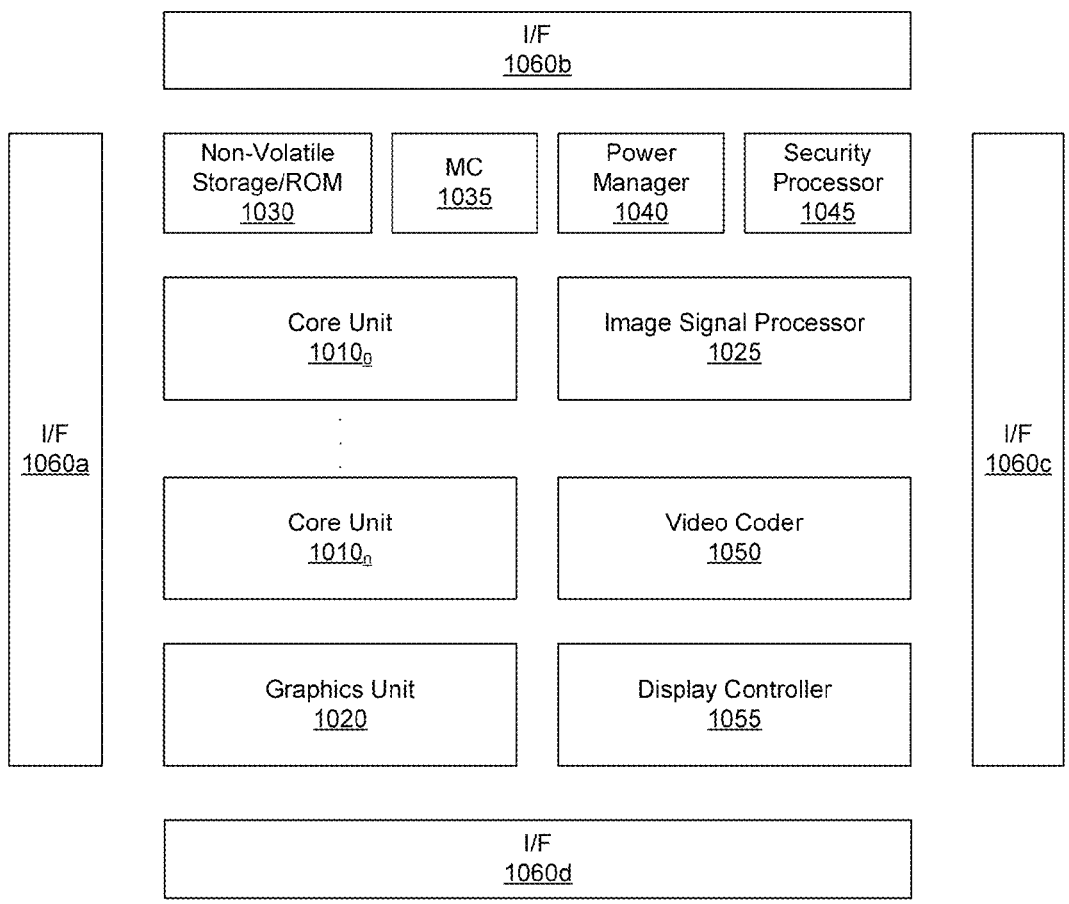
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units 10100-1010n. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform independent voltage control for clock distribution circuitry and the functional units driven by clocks generated by the distribution circuitry, as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

The following examples pertain to further embodiments.

In one example, a processor comprises: a plurality of functional units each to independently execute instructions; and a clock distribution circuit including a clock signal generator to generate a clock signal and a plurality of branches each to provide the clock signal to one of the plurality of functional units. The clock distribution circuit may be coupled to receive a first operating voltage from a first voltage rail and the plurality of functional units coupled to receive at least one second operating voltage from one or more second voltage rails. The first operating voltage and the at least one second operating voltage may be independent.

In an example, a plurality of level shifters are each coupled between a corresponding branch of the clock distribution circuit and a corresponding functional unit to shift the clock signal from the first operating voltage to the at least one second operating voltage. A controller may be coupled between pairs of branches of the clock distribution circuit to compensate for a phase shift between the clock signal provided by each of the pairs of branches. A first compensation circuit may control a voltage shift provided by a first level shifter coupled between a first branch of the clock distribution circuit and a first functional unit.

In an example, the plurality of branches each comprises a serial path of clock drivers coupled between a distribution node coupled to a phase lock loop corresponding to the clock signal generator and a corresponding one of the plurality of level shifters. At least one of the serial paths includes a different fanout width than a fanout width of others of the serial paths, in an example.

In an example, a power controller includes a clock control logic to dynamically modify the first operating voltage, where the first operating voltage is dynamically modified to a lower voltage level than a level of the at least one second operating voltage. The clock control logic may determine the level of the first operating voltage based at least in part on a requested operating frequency for each of the plurality of functional units. In turn, the first voltage rail may be coupled to receive the first operating voltage from a first voltage regulator and the one or more second voltage rails may be coupled to receive the at least one second operating voltage from the first voltage regulator.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: determining a first operating frequency at which a clock distribution circuit of a processor is to generate a clock signal based at least in part on one or more requested operating frequencies of a plurality of functional units of the processor; and causing a voltage regulator coupled to the clock distribution circuit to provide a first operating voltage to the clock distribution circuit. The first operating voltage may be independent of a second operating voltage provided to the plurality of functional units that receive the clock signal.

In an example, the method further includes level shifting the clock signal from the first operating voltage to the second operating voltage and providing the clock signal at the second operating voltage to a first functional unit of the plurality of functional units.

In an example, the method further includes determining a level of the first operating voltage based on one or more environmental conditions of the processor.

In an example, the method further includes compensating for a phase difference between the clock signal to be provided to a first functional unit and the clock signal to be provided to a second functional unit. In addition, the phase difference may be compensated until the phase difference is less than a threshold difference. And, the first operating voltage may be increased if the phase difference is not less than the threshold difference after a first duration.

In another example, a computer readable medium including instructions is to perform the method of any of the above examples.

In another example, an apparatus comprises means for performing the method of any one of the above examples.

In another example, a system comprises: a processor including a first voltage domain having a plurality of cores, a power controller, and a second voltage domain having a clock distribution network to generate a clock signal and to provide the clock signal to the plurality of cores. The first voltage domain may receive at least a first operating voltage and the second voltage domain may receive a second operating voltage. The system may further include a voltage regulator coupled to the processor. The voltage regulator may provide the at least one first operating voltage to the first domain via at least one first voltage rail and provide the second operating voltage to the second voltage domain via a second voltage rail. The power controller may determine a level for the at least one first operating voltage and the second operating voltage and communicate the level for the at least one first operating voltage and the second operating voltage to the voltage regulator.

In an example, the clock distribution network includes a phase lock loop to operate according to the second operating voltage, and the power controller is to instruct the phase lock loop to generate the clock signal at a requested operating frequency. The requested operating frequency may correspond to a highest requested operating frequency for the plurality of cores. The power controller may dynamically update the level for the at least one first operating voltage based on a change in an activity level of one or more of the plurality of cores, independently of the second operating voltage.

In another example, a machine-readable medium has stored thereon instructions, which if performed by a machine cause the machine to perform a method comprising: determining a level of a first operating voltage for a clock distribution circuit of a processor including a plurality of functional units, where the first operating voltage is independent of a second operating voltage supplied to the plurality of functional units; controlling a compensation logic of the clock distribution circuit to provide a clock signal generated by the clock distribution circuit operating at the first operating voltage to at least some of the plurality of functional units operating at the second operating voltage; and responsive to a change in an activity level of one or more of the plurality of functional units, to dynamically update the level of the first operating voltage.

In an example, the method further includes level shifting the clock signal from the first operating voltage to the second operating voltage and providing the clock signal at the second operating voltage to a first functional unit of the plurality of functional units.

In an example, the method further includes: compensating for a phase difference between the clock signal to be provided to a first functional unit and the clock signal to be provided to a second functional unit; determining if the phase difference is less than a threshold difference; and increasing the level of the first operating voltage if the phase difference is not less than the threshold difference after a first duration.

In an example, the method further includes receiving the first operating voltage via a first power rail coupled between the processor and a voltage regulator and receiving the second operating voltage via a second power rail coupled between the processor and the voltage regulator.

In an example, the method further includes determining a first operating frequency for the clock signal based at least in part on one or more requested operating frequencies of the plurality of functional units of the processor, and determining the level of the first operating voltage based on the first operating frequency and one or more environmental conditions of the processor.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of functional units;
a clock distribution circuit including a clock signal generator to generate a clock signal and a plurality of branches to provide the clock signal to the plurality of functional units, wherein the clock distribution circuit is coupled to receive a first operating voltage from a first voltage rail and the plurality of functional units are coupled to receive at least one second operating voltage from one or more second voltage rails, wherein the first operating voltage and the at least one second operating voltage are independent, the clock distribution circuit comprising a plurality of compensation circuits each coupled between a pair of branches of the clock distribution circuit to compensate for a phase shift between the clock signal provided by each of the pair of branches; and
a power controller including a clock control logic to dynamically modify the first operating voltage based at least in part on an operating frequency requested by one or more of the plurality of functional units, wherein the clock control logic is to control the first operating voltage to maintain the phase shift less than a threshold level.

2. The processor of claim 1, further comprising a plurality of level shifters each coupled between a corresponding branch of the clock distribution circuit and a corresponding functional unit to shift the clock signal from the first operating voltage to the at least one second operating voltage.

3. The processor of claim 1, further comprising a controller to control a voltage shift provided by a first level shifter coupled between a first branch of the clock distribution circuit and a first functional unit.

4. The processor of claim 2, wherein the plurality of branches each comprises a serial path of clock drivers coupled between a distribution node coupled to a phase lock loop corresponding to the clock signal generator and a corresponding one of the plurality of level shifters.

5. The processor of claim 4, wherein the serial paths of the plurality of branches have a same number of the clock drivers.

6. The processor of claim 4, wherein at least one of the serial paths includes a different fanout width than a fanout width of others of the serial paths.

7. The processor of claim 6, wherein the at least one serial path is associated with a vector-based functional unit.

8. The processor of claim 1, wherein the first voltage rail is coupled to receive the first operating voltage from a first voltage regulator and the one or more second voltage rails are coupled to receive the at least one second operating voltage from the first voltage regulator.

9. The processor of claim 1, wherein the processor comprises a first core, and the power controller is to cause the first core to operate at a turbo mode frequency and at a turbo operating voltage, the turbo operating voltage greater than the first operating voltage.

10. The processor of claim 1, wherein the threshold level comprises a maximum skew setting.

11. The processor of claim 10, wherein the processor is to dynamically adjust the maximum skew setting.

12. A machine-readable medium having stored thereon instructions, which if performed by a machine cause the machine to perform a method comprising:
determining a first operating frequency at which a clock distribution circuit of a processor is to generate a clock signal based at least in part on one or more requested operating frequencies of a plurality of functional units of the processor;
causing a voltage regulator coupled to the clock distribution circuit to provide a first operating voltage to the clock distribution circuit, the first operating voltage independent of a second operating voltage provided to the plurality of functional units of the processor that receive the clock signal; and
compensating for a phase difference between the clock signal to be provided to a first functional unit and the clock signal to be provided to a second functional unit until the phase difference is less than a threshold difference, including increasing the first operating voltage if the phase difference is not less than the threshold difference after a first duration.

13. The machine-readable medium of claim 12, wherein the method further comprises level shifting the clock signal from the first operating voltage to the second operating voltage and providing the clock signal at the second operating voltage to the first functional unit.

14. The machine-readable medium of claim 12, wherein the method further comprises determining a level of the first operating voltage based on one or more environmental conditions of the processor.

15. A system comprising:
a processor having a plurality of cores, a power controller, and a clock distribution network to generate a clock signal and to provide the clock signal to the plurality of cores, wherein the plurality of cores are to receive at least one first operating voltage and the clock distribution network is to receive a second operating voltage; and
a voltage regulator coupled to the processor, the voltage regulator to provide the at least one first operating voltage to the plurality of cores via at least one first voltage rail and to provide the second operating voltage to the clock distribution network via a second voltage rail, wherein the power controller is to determine a level for the at least one first operating voltage and independently determine a level for the second operating voltage based at least in part on a load of the clock distribution network and to communicate the level for the at least one first operating voltage and the level for the second operating voltage to the voltage regulator, the power controller to determine the second operating voltage further based at least in part on a change in an activity level of one or more of the plurality of cores.

16. The system of claim 15, wherein the clock distribution network includes a phase lock loop to operate according to the second operating voltage, wherein the power controller is to instruct the phase lock loop to generate the clock signal at a requested operating frequency.

17. The system of claim 15, wherein the power controller is to determine the level for the second operating voltage further based on at least one of thermal information, load line information and process information.

18. The system of claim 15, wherein the power controller is to dynamically update the level for the at least one first operating voltage based on the change in the activity level of the one or more of the plurality of cores, independently of the second operating voltage.

19. The system of claim 15, wherein the power controller is to determine the second operating voltage further based at least in part on an operating frequency requested by one or more of the plurality of cores.

* * * * *